US 8,255,416 B2

(12) United States Patent
Listou (10) Patent No.: US 8,255,416 B2
(45) Date of Patent: Aug. 28, 2012

(54) SYSTEM AND METHOD FOR CONTEXTUAL DATA MODELING UTILIZING TAGS

(75) Inventor: Robert Eugene Listou, Falls Church, VA (US)

(73) Assignee: Execware, LLC, Falls Church, VA (US)

( * ) Notice: Subject to any disclaimer, the term of this patent is extended or adjusted under 35 U.S.C. 154(b) by 0 days.

(21) Appl. No.: 13/288,451

(22) Filed: Nov. 3, 2011

(65) Prior Publication Data

US 2012/0079362 A1    Mar. 29, 2012

Related U.S. Application Data

(63) Continuation-in-part of application No. 13/216,834, filed on Aug. 24, 2011, which is a continuation of application No. 12/369,070, filed on Feb. 11, 2009, now Pat. No. 8,010,549, and a continuation-in-part of application No. 12/699,973, filed on Feb. 26, 2010, now Pat. No. 8,060,819.

(51) Int. Cl.
*G06F 17/30* (2006.01)

(52) U.S. Cl. .................... 707/769; 715/227; 715/243

(58) Field of Classification Search ............... 715/227, 715/236, 243; 707/735, 752, 761, 769, 750, 707/736, 705
See application file for complete search history.

(56) References Cited

U.S. PATENT DOCUMENTS

| 5,396,621 | A | 3/1995 | MacGregor et al. |
| 5,428,776 | A | 6/1995 | Rothfield |
| 5,566,330 | A | 10/1996 | Sheffield |
| 5,584,024 | A | 12/1996 | Shwartz |
| 5,619,688 | A | 4/1997 | Bosworth et al. |
| 6,134,564 | A | 10/2000 | Listou |
| 6,826,727 | B1 | 11/2004 | Mohr et al. |
| 7,792,842 | B2 * | 9/2010 | Goto ............... 707/750 |
| 8,010,549 | B2 * | 8/2011 | Listou ............ 707/761 |
| 8,060,819 | B2 * | 11/2011 | Listou ............ 715/227 |
| 2002/0103818 | A1 * | 8/2002 | Amberden ........ 707/205 |
| 2006/0053388 | A1 | 3/2006 | Michelman |
| 2006/0053389 | A1 | 3/2006 | Michelman |
| 2008/0027893 | A1 * | 1/2008 | Cavestro et al. .... 707/1 |
| 2009/0030914 | A1 * | 1/2009 | Goto ............... 707/100 |
| 2009/0148048 | A1 * | 6/2009 | Hosomi ........... 382/190 |
| 2009/0248184 | A1 | 10/2009 | Steingart et al. |

OTHER PUBLICATIONS

Ron Person; Special Edition Using Microsoft Excel 97; Dec. 17, 1996; Que Publishing; pp. 865-877.

* cited by examiner

*Primary Examiner* — Jean M Corrielus
(74) *Attorney, Agent, or Firm* — Tarek N. Fahmi (57) ABSTRACT

A computer-aided methodology of morphological analysis of a set of text data objects and associated graphic images named contextual data modeling (CDM) involves personal discovery of meaningful interrelations of parametric values and names of text data objects using permutation of a data table; plus viewing, for each text data object listed in the table, an integrated dialog box (item screen), containing the text data object's parametric data and other data; plus viewing tags that represent at least some of the text data objects. Display of the item screens and tags may be concurrent and coordinated with display of text data objects in the data table. Near real time operation may serve to optimize retention of perceived data in a computer user's short term working memory as reasoning leads to modeling (manipulating) the data, including editing and colorization, until the user's reasoning is reflected in the displayed data.

21 Claims, 4 Drawing Sheets

| Grid | Depth | Color | Material | Object | Item |
|------|-------|-------|----------|--------|------|
| 3 | 15 | Black | Wood | Box | 18 |
| 8 | 5 | Blue | Clay | Bowl | 12 |
| 8 | 6 | Gray | Stone | Figurine | 5 |
| 9 | 6 | Gray | Stone | Figurine | 10 |
| 10 | 19 | Gray | Clay | Bowl | 23 |
| 10 | 21 | Gray | Metal | Box | 24 |
| 11 | 6 | Brown | Wood | Figurine | 20 |
| 13 | 9 | Black | Stone | Knife | 3 |
| 17 | 4 | Gray | Clay | Bowl | 14 |
| 18 | 5 | Blue | Clay | Plate | 15 |
| 19 | 8 | Gray | Stone | Hammer | 22 |
| 19 | 9 | Green | Clay | Bowl | 13 |
| 19 | 16 | Brown | Metal | Bowl | 19 |

Figurines
All
Clay
12-24"
Black/Brown
Grid

SYSTEM AND METHOD FOR CONTEXTUAL DATA MODELING UTILIZING TAGS

CROSS-REFERENCE TO RELATED APPLICATIONS

This application is a CONTINUATION-IN-PART of U.S. patent application Ser. No. 13/216,834, filed Aug. 24, 2011, incorporated herein by reference, which is a CONTINUATION of U.S. patent application Ser. No. 12/369,070, filed Feb. 11, 2009, now U.S. Pat. No. 8,010,549; and is a CONTINUATION-IN-PART of U.S. patent application Ser. No. 12/699,973 filed Feb. 26, 2010 now U.S. Pat. No. 8,060,819, incorporated herein by reference.

FIELD OF THE INVENTION

This invention relates to the field of information processing and display by computers, particularly to an analytic methodology which the present inventor refers to as contextual data modeling (CDM).

BACKGROUND OF THE INVENTION

CDM is a systemized form of computer-aided morphological analysis that deals with concrete items in an orderly way in which no interrelations of the names and parameter values of text data objects on a data table are ignored a priori as being unimportant. Text data items analyzed using CDM include any type of objects or events with unique identifying names or numbers plus parameters such as weight, nationality, material, location, date, age, etcetera. It will be apparent that "things" or "items" exist in many fields of investigation, analysis, and research that can be listed in data tables and that many interrelations are possible.

The concept of CDM is analogous to modern technology installed in the instrument panels of aircraft. Data formerly displayed to pilots on a variety of separate instruments displaying one variable, for example artificial horizon, direction, altitude, climb rate, speed, fuel, etc., can now be displayed to pilots as computer-produced imagery in a single screen on the instrument panel. That practice and CDM are both intended to consolidate on a currently viewed computer monitor or, optionally in CDM, several monitors, as much relevant data as possible to aid the viewer in reasoning about next steps. In CDM software, the data relate to a set of text data objects and associated graphic images. The design criteria for the graphical user interface (GUI) of CDM software are fourfold, as follows. One, all permutations of automated CDM data tables must be examined to ensure that no important interrelations are overlooked; two, processes must maximize real time operation in view of, as taught by cognitive science, the limited duration in human memory of currently viewed data about which the software user is reasoning; three, the user should have immediately available, preferably imaged concurrently, as much information as possible about items being examined; and, four, the user must be able to rapidly edit viewed data to reflect her or his reasoning and, if desired, add color to text and/or backgrounds for later reference.

SUMMARY OF THE INVENTION

In one embodiment of the invention, a CDM user may visually discover meaningful interrelations among a set of text data items being analyzed by viewing and manipulating, in response to his or her reasoning, associated data displayed in selected groups of images or data tables. The context for evaluating a single or small group of displayed data objects is concurrent display of as much data as possible about the target text data objects. With the present invention the user may record, for separate visible access in the set of images comprising the context, brief remarks about the significance of an item to the overall analysis. In some cases, these recordings may be referred to as "tags."

Hence, the present invention may be regarded as an improvement of the analytic methodology described in the inventor's prior U.S. Pat. Nos. 6,134,564 and 6,216,139, and may include systems and methods for the automated permutation of computer-produced data tables that list text data objects through manipulation of a plurality of tags, each of the tags representing corresponding ones of the data objects in the data tables. Concurrent imaging of a data table of text data objects and/or data items, an integrated dialog box defined herein as a CDM item screen, and the tags associated with the data objects via a display unit, such as a touch screen display unit, is also supported.

In various embodiments, the present invention provides for consolidating, in a choice of configurations, the imaging of the data table, an item screen, and tags associated with data objects and/or data items listed in the table. Such combined displays meet CDM design criteria which seek to provide the user immediately available information regarding items being examined.

DETAILED DESCRIPTION

Described herein are methods and systems for information processing and, particularly for use in connection with an analytic methodology which the present inventor refers to as contextual data modeling (CDM). The present methods and systems allow for computer-aided morphological analysis of a set of text data objects and associated graphic images, allowing a user to uncover meaningful interrelations of data objects (e.g., text data objects) organized in a data table through the manipulation of tags that represent at least some of the data objects. Display of various item screens and tags may be concurrent and coordinated with display of the data objects in the data table. Near real time operation may serve to optimize retention of perceived data in the computer user's short term working memory as reasoning leads to modeling (manipulating) the data, including editing and colorization, until the user's reasoning is reflected in the displayed data.

It will be apparent to the reader that embodiments of the present invention are intended to be practiced with and on one or more computer systems. Accordingly, various embodiments of the present invention may be implemented with the aid of computer-implemented processes or methods (a.k.a. programs or routines) that may be rendered in any computer-executable language. In view of the above, it should be appreciated that some portions of the description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. Unless specifically stated otherwise, it will be appreciated that throughout the description of the present invention, use of terms such as "processing", "computing", "calculating", "determining", "displaying" or the like, refer to the action and processes of an appropriately programmed computer system, or similar electronic computing device, that manipulates and transforms data represented as physical (electronic) quantities within the computer system's registers and memories into other data similarly represented as physical quantities within the computer system memories or registers or other such information storage, transmission or display devices.

The computer systems with and on which embodiments of the present invention can be implemented may be specially constructed for the required purposes or may comprise a computer system that is selectively activated or reconfigured by a computer program which it executes and which is stored on one or more computer-readable storage mediums accessible to processing elements of the computer system. For example, such a computer program may be stored in a non-transitory computer readable storage medium, such as, but not limited to, any type of disk including hard disks, floppy disks, optical disks, compact disk read only memories (CD-ROMs), and magnetic-optical disks, read-only memories (ROMs), flash memories, random access memories (RAMs), erasable programmable read only memories (EPROMs), electrically erasable programmable read only memories (EEPROMs), other forms of magnetic or optical storage media, or any type of media suitable for storing computer-executable instructions, and each accessible to a computer processor, e.g., by way of a system bus or other communication means.

The algorithms and processes presented herein are not inherently related to any particular computer system, processor or other apparatus. Various electronic computing apparatus, along with, where necessary, suitable computer programs that instantiate processes in accordance with the teachings herein, may be used. For example, any of the present methods can be implemented in hard-wired circuitry, by appropriate programming of a computer processor or processors, or a combination of hardware and software may be used to carry out the methods discussed below. Of course, the invention can be practiced with computer system configurations other than those particularly described below, including systems that comprise hand-held devices (e.g., tablets, smart phones, etc.), multiprocessor systems, microprocessor-based electronic devices, digital signal processor-based devices, networked computer systems, minicomputers, mainframe computers, personal computers, and the like, and it should be recognized that these examples presented herein are used merely for purposes of illustration. The invention can also be practiced in distributed computing environments where tasks are performed by computer processing devices that are remote to one another, either physically and/or logically, and are linked through one or more communications networks. The required structure for a variety of these systems will appear from the description below.

By way of non-limiting example, a computer system upon which an embodiment of the invention may be implemented will generally include a bus or other communication mechanism for communicating information, and a processor coupled with the bus for processing information. Main memory, such as a RAM or other dynamic storage device, will be communicatively coupled to the processor and available for storing information and instructions to be executed by the processor. Such main memory also may be used for storing temporary variables or other intermediate information during execution of instructions by the processor. Further, a ROM or other static storage device will be communicatively coupled to the processor for providing stored static information and instructions for the processor and other storage devices, such as a hard disk or flash memory, may be provided and communicatively coupled to the processor for providing stored information and instructions.

The subject computer system will also have one or more displays for displaying information to a computer user. An input device, including alphanumeric and other keys, may also be provided for communicating information and command selections to the processor, although in some instances this may be accomplished through a virtual keyboard rendered on the display. Other user input devices for cursor control, such as a mouse, trackball, joystick, touchpad, or cursor direction keys may be provided for communicating direction information and command selections to processor and for controlling cursor movement on the display.

As will become apparent from the discussion below, the invention is related to the use of a computer system to aid the user in organizing information in ways that reveal meaningful interrelations of data objects. Instructions for performing such operations and displaying results thereof may be stored as sequences of instructions in main memory, static memory or a combination thereof, and may be read from main memory or another computer-readable medium for execution by the processor as needed (e.g., in response to user commands, etc.). Execution of the sequences of instructions contained causes the processor to perform the process steps described below.

The subject computer system may also include a communication interface for providing two-way data communication (e.g., via a local area network (LAN) or other means) to and from the computer system. In any such implementation, the communication interface sends and receives electrical, electromagnetic or optical signals which carry digital data streams representing various types of information. For example, two or more computer systems of the type described herein may be networked together in a conventional manner with each using a respective communication interface to exchange information. In this way, the subject computer system may access data stored remotely and/or provide display information to displays situated remote from the processing unit.

Figure 1:
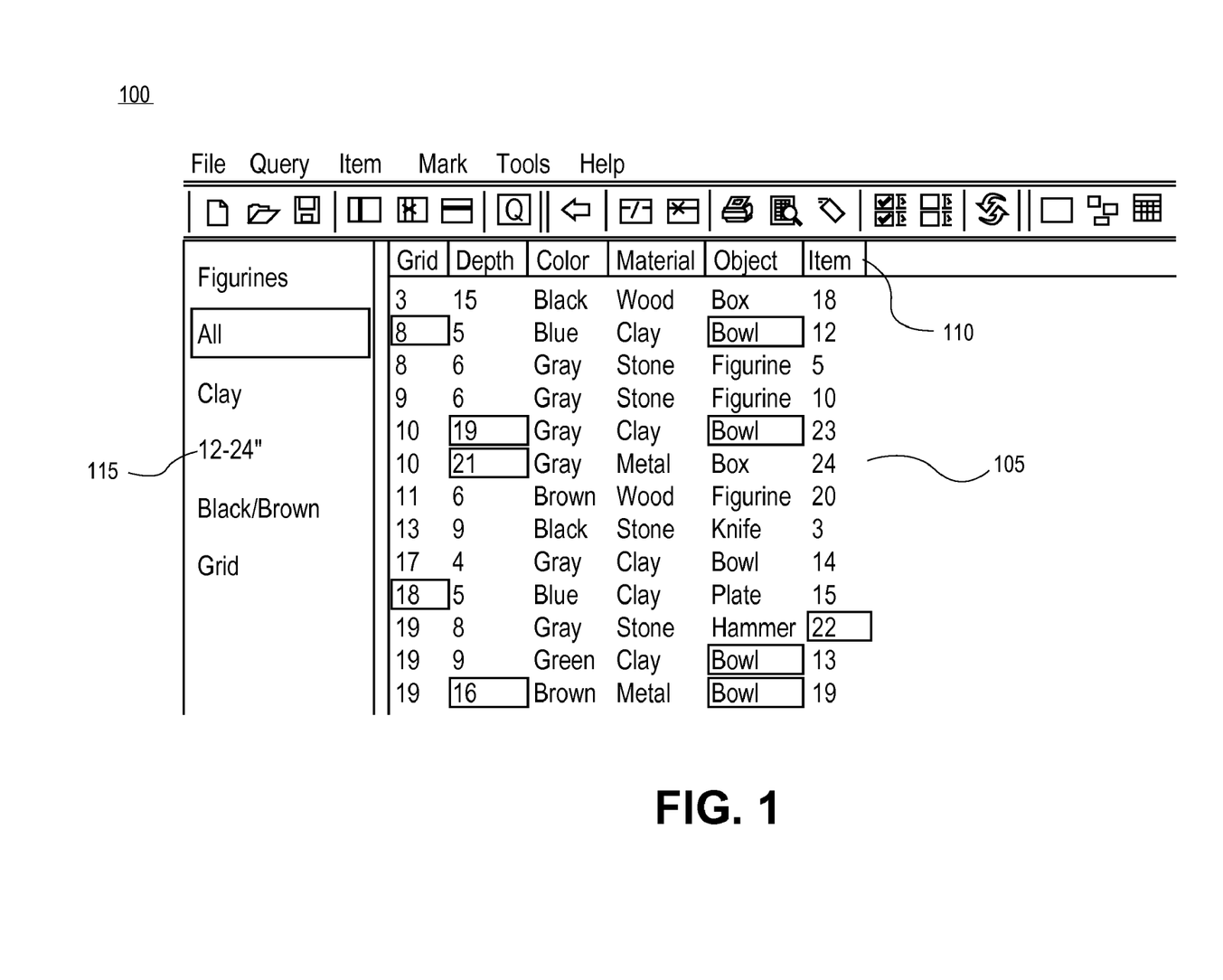
FIG. 1 depicts a data table specifying text data objects and values for identified parameters assigned to the text data objects.

With the foregoing in mind, we turn now to a discussion of the present systems and methods for information processing. FIG. 1 depicts a portion of a data table view screen (100) as may be rendered on a display of the subject computer system described above. It will be appreciated that although the computer systems elements are not shown in detail (so as not to unnecessarily obscure the details of the present invention), all of the display and processing operations discussed herein are preformed by and on the computer system and when actions of a user are discussed it is those actions as are implemented using the computer system. Data table view screen (100) includes a data table (105) that includes a plurality of data objects (or data items), typically represented by a row in data table (105). Each data object is associated with parameter (110) values. On some occasions, a data object may be linked to other information and the link parameter for the data object may be displayed as "yes" or "no," accordingly. When a data object associated with a link is selected, an item screen, such as item screen (200) as discussed below with regard to FIG. 2, may be displayed. Table (115) indicates subsets of data to be displayed in data table (105) that may have been selected from a larger data set. For example, sets of data objects associated with one or more parameter values may be selected for display in data table (105). Further discussion of table (115) is provided below with regard to FIG. 5.

When the user of the present CDM software instructs the computer system to automatically display, at a speed determined by the user, a sequence of permutations of the data table, the number of such permutations is determined by the number of parameters. For example, a table with 4 parameters can have 24 permutations; with 5 parameters, 120 permutations; with 6 parameters, 720 permutations; and so on. With each new permutation of the table, the vertical and horizontal locations of parameter values and the vertical locations of the object names change location because of the different sort orders of each permutation. Employing a form of combinatorial reasoning, the user of the CDM software may examine some or all possible combinations of parameter values, and differing sequences of names, to find meaningful interrelations, actual or perceived. The user may employ in-place editing and colorization of text and cells to reconcile the data on the table with his or her reasoning. The user may proceed through the various permutations via a manual and/or automatic process that may be user configurable.

Figure 2:
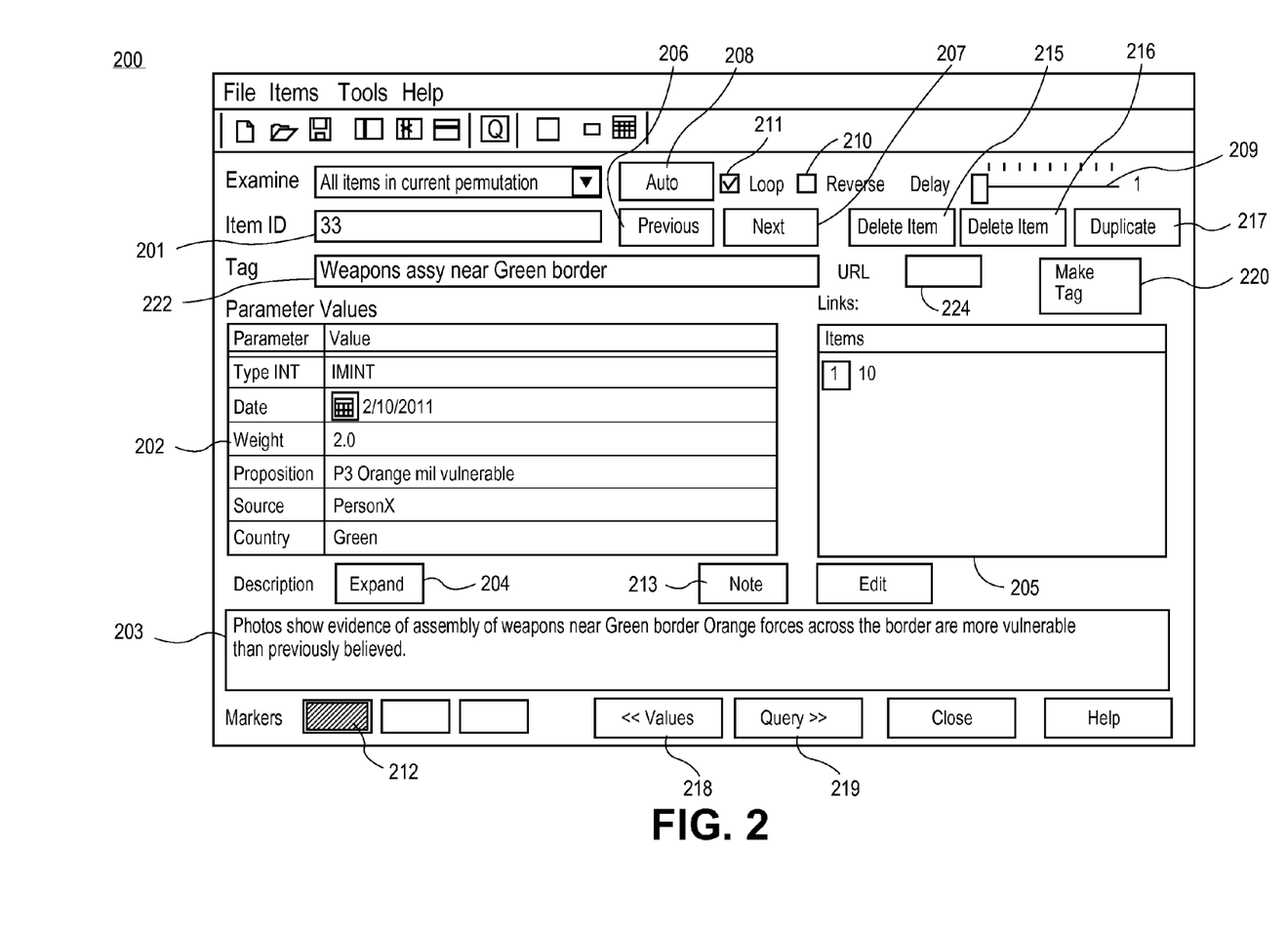
FIG. 2 is an integrated dialog box, called the item screen, imaged by selecting an item name or data object on the data table depicted in FIG. 1.

Consistent with the objective of enabling the user to simultaneously perceive visually a plurality of sources of data about the items listed in a data table, the CDM concept addresses the item screen (200) illustrated in FIG. 2. Item screen (200) may be used to enter information concerning data objects, from which is selected a dataset for populating data table 105, as well as to enter additional data for subsequent reference. Item screen (200) may be displayed when, for example, the user selects a data object displayed in data table (105). Item screen may include the item name (201), the item's parameters and their values (202), a field for descriptive text (203) that can be expanded by selecting (204) to reveal a large quantity of text comprising more information about the data object than its name and parameter values, optionally including observations entered during previous evaluations of the data object by the user or users. Another field (205) lists other items on the data table that have been selected as related items, the item screens of which can be accessed by selecting their names in this field. At times, multiple item screens (200) for data objects in data table (105) may be available to the user as a virtual stack of such screens. The user can view them sequentially, for example, in the order the data objects are listed in the data table (105), in a manual fashion by selecting the Previous (206) or Next (207) buttons, or through an automated sequencing by selecting Auto (208) and specifying a delay interval with a slider control (209). For continued perusal of the item screens the user can also elect to see them in reverse order by selecting the box at (210), and can also cause the sequence to loop by selecting (211). After the Auto mode (208) has been selected, that word on the button is automatically replaced by the word Stop, which can be selected to stop the automated sequencing.

A user rapidly browsing through a virtual stack of item screens can be aided by a visual sorting mechanism. In visual retrieval fields (212), the user can enter any character and/or color in one or all of the fields. The means of entering characters and affixing colors are known to those skilled in the art. While browsing, the user may also wish to enter temporary notes in a dialog box opened by selecting the Note button (213). Later, while sequencing the virtual stack of item screens, contents of the marker fields (212) aid in visual retrieval, and the presence of a note may be indicated when that item screen is displayed through the use of a Note icon or other indicator (e.g., a "Note Attached" indicator preceding button (213)) and/or the playing of an audible sound when the relevant item screen is displayed. The user can manipulate the content of a current virtual stack of items screens (200) by adding a new item (215), deleting a current item being examined (216), or creating a duplicate item (217) when reasoning leads to the wish for a new item that is similar to the one being examined, said duplicate then being edited and renamed.

Responsive to CDM design criteria number two regarding rapid operation, the user may either perform in-place editing or select a value button (218) to open a dialog box with a drop-down list of the current parameters and their values from which a selection can be made. When this item screen is used to enter data for the final item to be listed on the data table, the user may select a query button (219) to image an integrated dialog box, as discussed in U.S. Pat. No. 6,216,139, in which the desired select and sort criteria are entered.

On some occasions, a representation of a data object as a tag may be desired. For example, a tag may serve as a shortcut to accessing information related to the data object associated with the tag. A user may associate a tag with a data object depicted in item screen (200) via, for example, entering content for the tag into tag field (222) and/or selecting a make tag button (220). Tag field (222) may be expandable to accommodate text entry as needed. In one embodiment, the user may enter text into tag field (222) and selection of make tag button (220) may create a tag using the text so entered and/or item ID (201). The resulting tag (300) may be displayed in a tag screen (404) as discussed below with regard to FIGS. 3 and 4, respectively.

The contents of a tag may be manually or automatically determined and may include, for example, alpha-numeric characters, images, and/or graphic elements. In some instances, the user may create a tag using an ad hoc or informal phrase to identify, for example, a data object or relationship between data objects. On some occasions, a tag may be automatically created following selection of make tag button (220) without further user input and a title for the tag may be automatically created and displayed in a tag field (222).

In some embodiments, item screen (200) may include a URL dialog box 224 into which a file address or URL may be entered that may enable a user to access, display, or play a data file (e.g., a document, photograph, map, audio file, or IP address) associated with the subject data object and/or tag. A URL's association with item screen (200) may in fact be indicated by a tag, such as tag (300), via a tag type indicator, such as tag type indicator (320) depicted in FIG. 3. Once created, any available means may be employed to delete a tag. Optionally, a report including tags and other associated information may be generated and provided to the user at, for example, the user's request.

Figure 3:
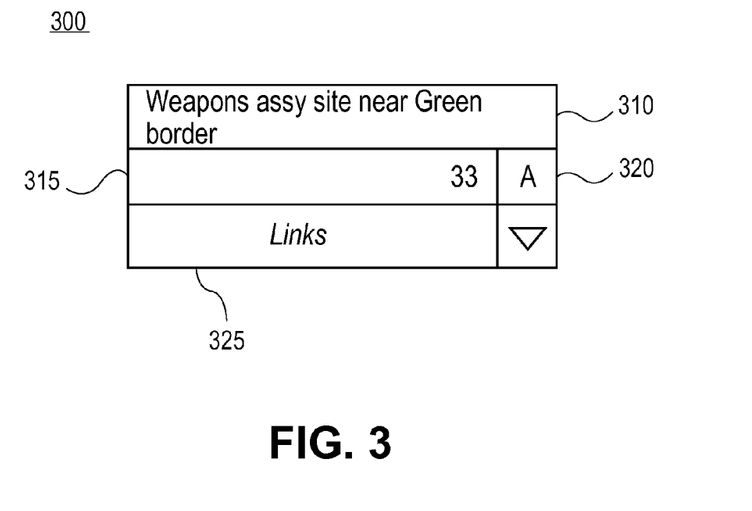
FIG. 3 depicts exemplary tags for data objects included in the data table shown in FIG. 1.

An exemplary tag (300) is depicted in FIG. 3. Tag (300) may include tag text (310) that succinctly states the essence of the associated data object and a data object ID (315). Data object ID (315) may be, for example, a series of alphabetical and/or numeric characters that indicate identification information for an associated data object. In some cases data object ID (315), may be similar, or identical, to the item parameter displayed in data table (105) for the associated data object and/or the item ID (201) displayed on item screen (200) for the associated data object. On some occasions, selection of data object ID (315) initiates display of, for example, a data object, a data table, and/or item screen (200) associated with tag (300). A single tag may, in some cases, be associated with more than one data object.

Tag (300) may also include a tag type indicator (320) that indicates the existence and type of accessible data file that is associated with a respective data object from data table (105). For example, tag type indicator (320) may indicate that the data object associated with the tag and/or a data file associated with the data object is an image file, an audio file, a document file, a web file or a combination of various ones of the foregoing. In some embodiments, tag type indicator (320) may act as a link to data files and/or data object(s) associated with tag (300) such that selection of tag type indicator (320) opens the associated data file(s)/object(s). Selection of links button (325), for example via a touch or gesture when using a touch screen or similar display device, may initiate display of information associated with and/or linked to the data object(s) associated with tag (300).

Figure 4:
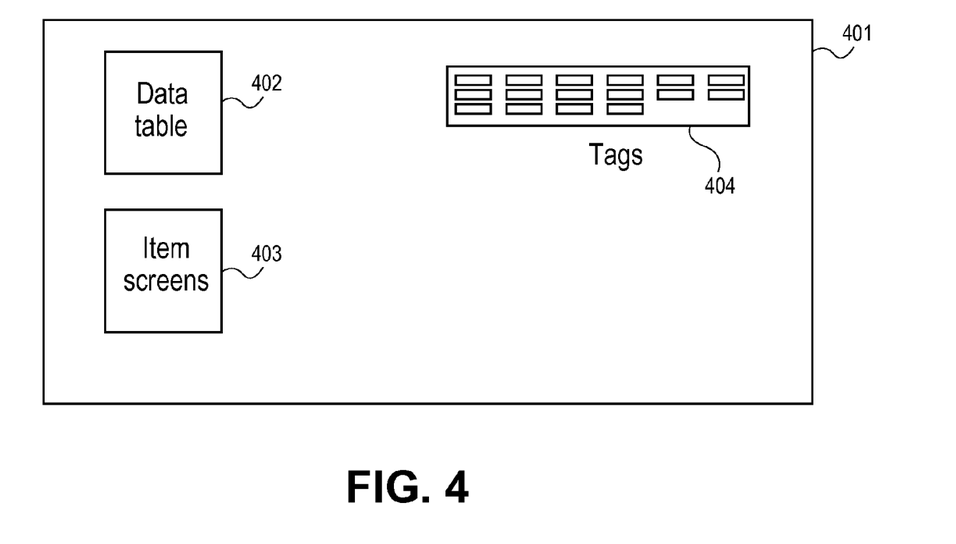
FIG. 4 depicts the simultaneous display of a data table, an item screen, and a group of tags associated with text data items listed in the data table.

CDM design criterion number four calls for enabling the user to perceive simultaneously a plurality of sources of data about the items listed in a data table. The present invention accommodates this requirement by allowing the concurrent display of data tables, item screens and/or tags associated with various ones of the data objects in the data table. FIG. 4 depicts such an example. As shown, a data table (402), associated item screen(s) (403), and a collection of tags may be provided within a single display environment (401) (e.g., as may be rendered on one or more displays available to a user). The data table, item screen(s) and tags may be rendered in individual windows or within a common window, or various combinations of same. The tags may be arranged in a table or grid-like fashion (referred to herein as a tag screen (404)), as shown, but this need not necessarily be true. The tags may be similar to tag (300), discussed above, data table (402) may be similar to data table (100), and items screens (403) may be similar to item screen (200).

The array or other assembly of tags provided in tag screen (404) provides an alternative visual representation of the data objects than is provided by data table (402). This visual representation may enable a user to perceive relationships among the tags and/or associated data objects that is not readily apparent from the view provided by the data table. The relative location of a subject tag (vis-à-vis the other tags) within the array or assortment of tags provided in tag screen (404) may be determined by the corresponding location of the data object associated with the subject tag (vis-à-vis the other corresponding data objects) within data table (402). In some embodiments, a shape or dimension of the array of tags may be adjusted by adjusting the borders of tag screen (404). For example, the borders of an array of twenty tags may be adjusted to provide an array of tags that includes four columns and five rows of tags or two columns and ten rows of tags. The tag screen may further include user-manipulable controls for manually or automatically repositioning placement of tags in the tag screen and thereby automatically repositioning corresponding data objects within the data table. Thus the organization of tags (in a tag screen (404) or otherwise) affords the user a view of the data objects which is readily understandable and manipulable. Like the aircraft displays discussed above, which seek to present a complex set of information to pilots in an understandable, comprehensive fashion, the organization of the tags can assist the user by bringing together a complex set of data objects, each distilled to its essential characteristics, and presented alongside one another in order to allow the user to comprehend their interrelationships in a quick and meaningful way. Further, because the tags can be rapidly and easily rearranged with respect to one another, the user is provided the opportunity to alter the view of the data objects to suit his or her needs, whims or curiosity and thereby to explore potential new relationships among the data objects as reveal themselves through these new view. Such opportunities for aiding human understanding of complex interrelationships of data objects is at the crux of CDM It will be apparent that arrangement of data table 402, item screen(s) (403) and tag screen (404) with respect to one another within the single display environment (401) can be altered from that shown in FIG. 4. Indeed, the relative locations of these items with respect to one another may be determined automatically by the computer system (e.g., subject to criteria for user viewing convenience, the available screen area of a display unit, and other factors) and/or may be determined manually by a user.

As mentioned above, the position of a tag within tag screen (404) may be correlated with the position of an associated data object within a data table such that when a tag is repositioned (relative to other tags) within tag screen (404), the associated data object may likewise be repositioned (with respect to other data objects) in the data table in a manner representative of the tag's new position within tag screen (404) (vis-à-vis the other tags). Likewise, when a subject data object is repositioned (with respect to other data objects) within the data table, for example, during a sequential permutation or otherwise, a tag associated with the subject data object may likewise be repositioned (vis-à-vis the other tags) in a manner representative of the subject data object's new position within the data table (vis-à-vis the other data objects). In this way, a user may simultaneously view the permutations of data objects within the data table (402), information displayed on associated item screens (403), and the relative positions of tags within the tag screen (404). In some embodiments, the single display environment (401) may be or include an interactive screen, such as a touch-screen and the user may be able to interact with the data table (402), item screen(s) (403) and tags within the tag screen (404) by executing a touch or a gesture on the touch-screen display unit.

Note that in some cases, the tags may be decoupled (e.g., via user selection or as a matter of program preferences, etc.) from their respective data objects in the data table, such that when tags are repositioned with respect to one another in tag screen (404), the associated data object(s) are not automatically repositioned within the data table. This may be useful where users want to make a quick examination of a few different organizations of data objects, but not disturb a carefully ordered permutation thereof within the data table. Alternatively, or in addition, in some embodiments the data table permutations can be saved so that if tag repositioning does result in reordering of data objects in a data table, the user can quickly revert to the desired permutation of that data table.

Above, it was noted that tags an be created from the item screens. The item screen includes user-manipulable controls for manually or automatically repositioning a data item in the data table (and thereby automatically repositioning a tag correlated with the repositioned data item within the tag screen). Alternatively, or in addition, a tag may be created by user interaction with tag screen (404). For example, a user may initiate creation of a tag by touching or otherwise selecting an area within the tag screen (404) and thereby initiate display of a blank tag into which the user can enter information for the tag. Further, tag screen (404) may be modified when the user selects, deselects, or deletes tags. On some occasions, modification of tag screen (404) may result in reorganization of the associated data objects in data table (402) or item screens (403).

Figure 5:
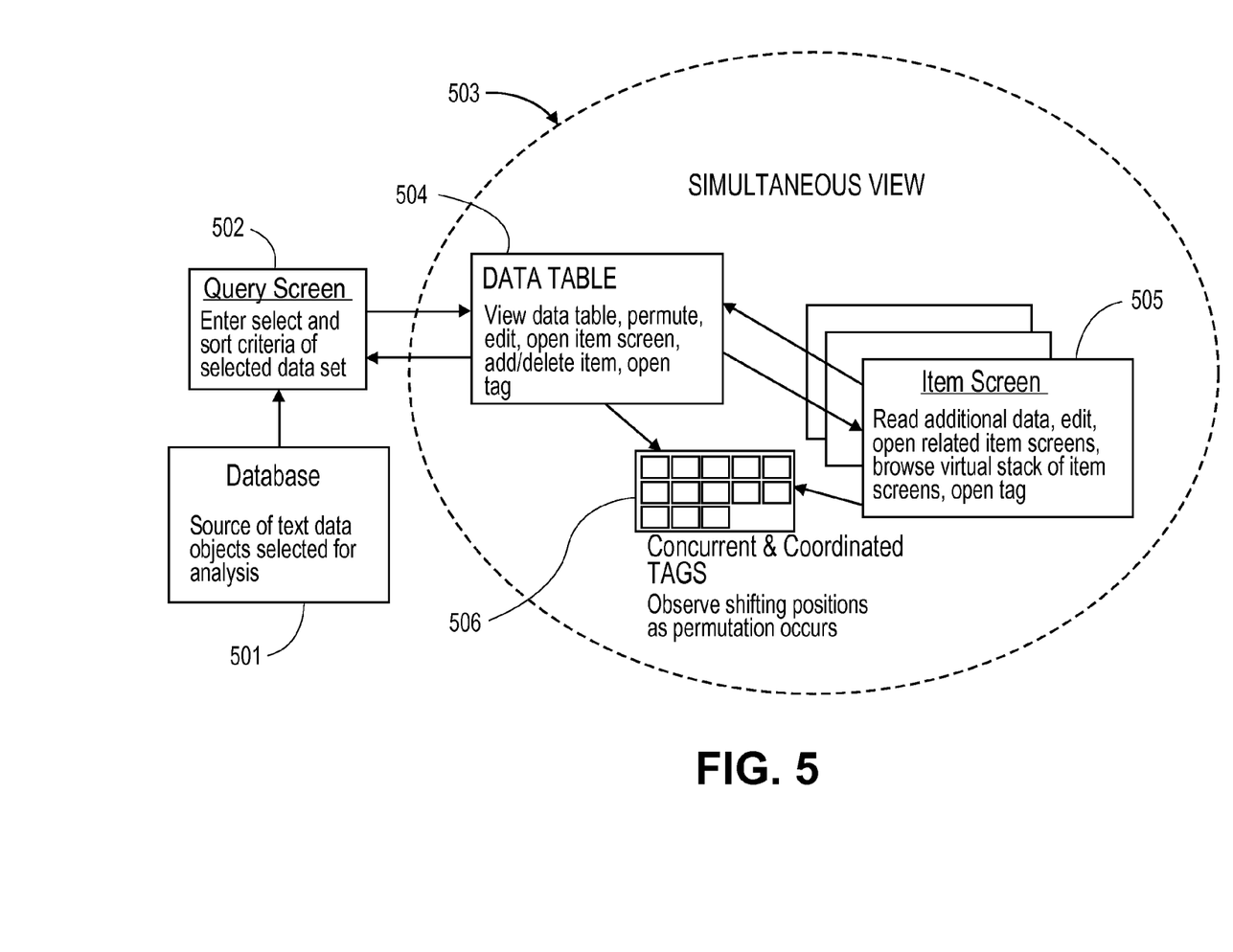
FIG. 5 depicts simultaneous viewing of a data table, a virtual stack of item screens, and tags associated with data objects listed in the data table. Also shown are a database and integrated dialog box, called a query screen, that defines the dataset of selected items that are to be analyzed, as discussed in the present inventor's U.S. Pat. No. 6,216,139.

FIG. 5 adds brief summaries of user operations and encloses the three elements of FIG. 4 in a dotted oval. In FIG. 5, a database (501) contains all records of text data objects from which the user can create a derivative smaller dataset using a query screen (502), as discussed in U.S. Pat. No. 6,216,139, to enter select and sort criteria that define the content of a data table. Examples of smaller data sets are provided in table (115) as discussed above with regard to FIG. 1. The oval boundary (503), which depicts the same display environment as in FIG. 4 but includes brief summaries of user operations, serves to emphasize the concentration of data made visible concurrently to the user. The query screen (502) could, although not frequently employed while modeling the data, become a fourth element of a concurrent view. The modeling operations of the data table (504) with other CDM elements are depicted with two-way arrows depicting the shifting attention of the user. The item screen (505) has components discussed in both above-cited patents, while the present invention adds a tag screen (506) including a plurality of tags that shift positions as permutations of data objects associated with the tags occur.

Thus, methods and systems for information processing and, particularly, for use in connection with CDM have been described.

What is claimed is:

1. A computer-implemented method for sorting and displaying a plurality of permutations of a table of data objects, comprising:
    concurrently displaying, by a computer system, a data table containing a number of data objects, each with associated values of specified parameters, and a collection of tags, each of the tags representing a respective data object of the number of data objects, each respective tag including identifying information for a respective one of the data object objects, wherein an organization of the tags with respect to one another on a display system of the computer system is correlated with an organization of the data objects within the data table; and
    responsive to an adjustment of the organization of the tags with respect to one another through user input, automatically reorganizing the data objects within the data table to a corresponding organization to reflect said adjustment.

2. The computer-implemented method of claim 1, further comprising concurrently displaying, with the data table and the tags, one or more item screens, said item screens concerning selected ones of the data objects in the data table and including parameter value information concerning said selected ones of the data objects from the data table, said item screens including user-manipulable controls for entering information concerning said selected ones of the data objects, including references to related others of the data objects in the data table.

3. The computer-implemented method of claim 2, wherein the item screen further includes user-manipulable controls for manually or automatically repositioning a placement of a data item in the data table and automatically repositioning a placement of a tag correlated with the repositioned data item within the tag screen.

4. The computer-implemented method of claim 1, wherein the tags are organized in a tag screen and said tag screen further includes user-manipulable controls for manually or automatically repositioning a placement of a tag in the tag screen and automatically repositioning a placement of a data object correlated with the repositioned tag within the data table.

5. The computer-implemented method of claim 1, wherein at least one tag is not correlated with a data object.

6. The computer-implemented method of claim 1, wherein the concurrent display of the data table and the tags is via a single display unit.

7. The computer-implemented method of claim 1, wherein the concurrent display of the data table and the tags is via a single touch-screen display unit.

8. The computer-implemented method of claim 7, wherein a user is enabled to reposition at least one of a data object included in the data table and a tag included in the tags via executing a touch or a gesture on the touch-screen display unit.

9. The computer-implemented method of claim 7, wherein a user is enabled to select at least one data object or tag and access data linked to the selected data object or tag via executing a touch or a gesture on the touch-screen display unit.

10. The computer-implemented method of claim 1, wherein a user is enabled to select a data object and associate a tag with the selected data object.

11. The computer-implemented method of claim 1, wherein a tag is generated manually or automatically.

12. The computer-implemented method of claim 1, wherein a tag is correlated with two or more data objects.

13. A computer-implemented method for sorting and displaying a sequence of permutations of a table of data objects, comprising:
    concurrently displaying, by a computer system, (a) a data table containing a number of data objects, each with associated values of specified parameters, (b) an item screen, said item screen concerning a selected one of the data objects in the data table and including (i) parameter value information concerning said selected one of the data objects from the data table, and (ii) user-manipulable controls for entering further information concerning said selected one of the data objects, including references to related others of the data objects in the data table, and (c) a tag screen depicting a plurality of tags, each of the tags representing a data object and including identifying information for the data object, wherein an organization of the tags as depicted in the tag screen is correlated with an organization of the data objects depicted in the data table; and
    responsive to user input specifying sequential permutations of the data objects in the data table, automatically reorganizing the tags with respect to one another such that the tags in the tag screen undergo sequential permutations that correspond to the sequential permutations of the data objects.

14. The computer-implemented method of claim 13, wherein the item screen further includes user-manipulable controls for manually or automatically sequencing through individual pages, each respective page associated with a respective one of the data objects in the data table, for each said individual page, presenting parameter value information for said respective data object.

15. The computer-implemented method of claim 14, wherein the item screen further includes user-manipulable controls for specifying a delay interval during automated sequencing of the individual pages.

16. The computer-implemented method of claim 14, wherein the sequencing is in forward or reverse order through the individual pages according to user input via the user-manipulable controls of the item screen.

17. The computer-implemented method of claim 14, wherein the sequencing continuously loops through the individual pages or not according to user input via the user-manipulable controls of the item screen.

18. The computer-implemented method of claim 13, wherein the concurrent display of the data table screen, the item screen, and the tag screen is via a single display unit.

19. The computer-implemented method of claim 13, wherein the concurrent display of the data table screen, the item screen, and the tag screen is via a single touch-screen display unit.

20. The computer-implemented method of claim 19, wherein a user is enabled to select at least one of the item screen, the data table screen, the tag screen, a data object included in the data table screen, and a tag included in the tag screen via executing a touch or a gesture on the touch-screen display unit.

21. The computer-implemented method of claim 13, wherein a tag is not correlated with a data object.

* * * * *